No. 724,476. PATENTED APR. 7, 1903.
J. F. HINRICHS & T. R. TAMMEN.
HORSE RELEASING DEVICE FOR VEHICLES.
APPLICATION FILED NOV. 7, 1902.
NO MODEL. 2 SHEETS—SHEET 1.
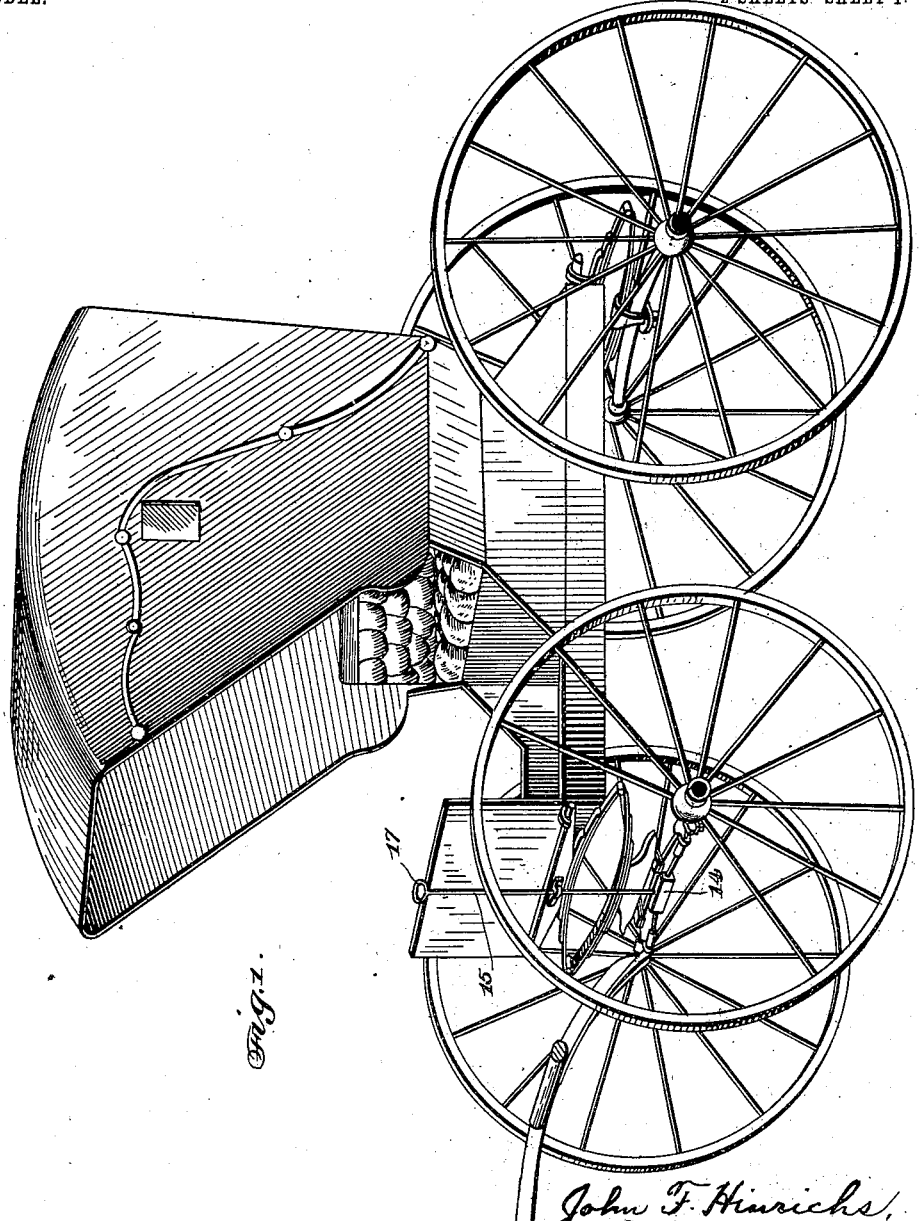

No. 724,476. PATENTED APR. 7, 1903.
J. F. HINRICHS & T. R. TAMMEN.
HORSE RELEASING DEVICE FOR VEHICLES.
APPLICATION FILED NOV. 7, 1902.
NO MODEL. 2 SHEETS—SHEET 2.
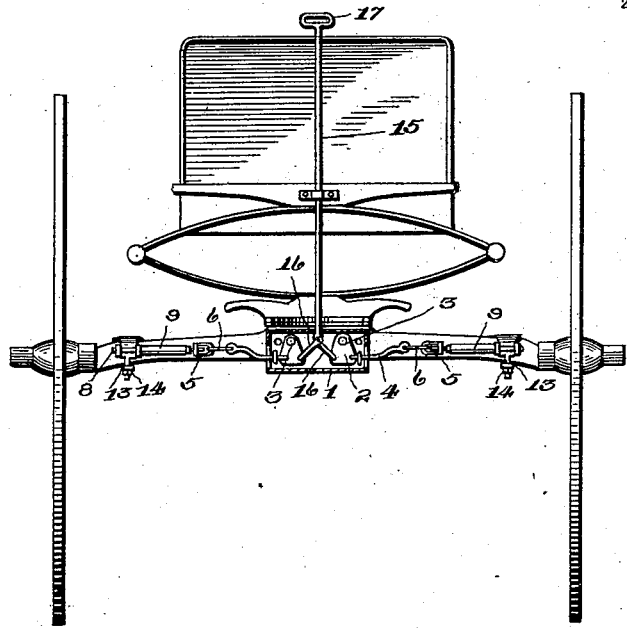
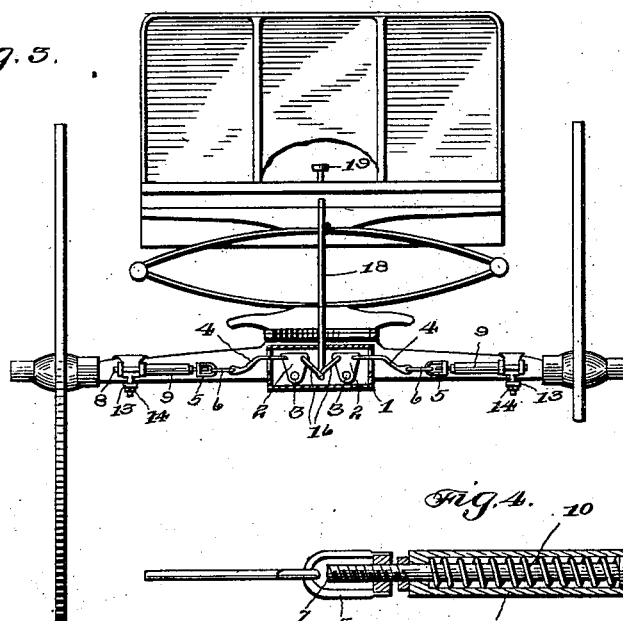
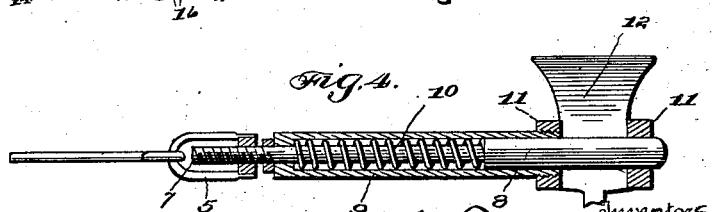
Witnesses
R. A. Boswell
A. G. Miller
Inventors
John F. Hinrichs
Tamme R. Tammen
By W. T. Fitzgerald
Attorneys

UNITED STATES PATENT OFFICE.

JOHN F. HINRICHS AND TAMME R. TAMMEN, OF PARKERSBURG, IOWA.

HORSE-RELEASING DEVICE FOR VEHICLES.

SPECIFICATION forming part of Letters Patent No. 724,476, dated April 7, 1903.

Application filed November 7, 1902. Serial No. 130,445. (No model.)

*To all whom it may concern:*

Be it known that we, JOHN F. HINRICHS and TAMME R. TAMMEN, citizens of the United States, residing at Parkersburg, in the county of Butler and State of Iowa, have invented certain new and useful Improvements in Releasing Devices for Vehicles; and we do hereby declare the following to be a full, clear, and exact description of the invention, such as will enable others skilled in the art to which it appertains to make and use the same.

Our invention has relation to vehicles, and more particularly to a releasing device adapted to be placed upon vehicles to which draft-animals are attached; and our invention consists of certain novel features of combination and construction of parts, the preferred form whereof will be hereinafter fully described and claimed.

The prime object of our invention, among others, is to provide means for instantly releasing the horse or horses drawing a carriage, wagon, or other form of vehicle when the animal or animals are running away, and thus liable to endanger the lives of the occupants of the vehicle and threaten the destruction of the vehicle itself.

Other objects and advantages will be hereinafter made clearly apparent, reference being had to the accompanying drawings, made a part of this application, and in which—

Figure 1 is a perspective view of our invention applied to use upon an ordinary buggy. Fig. 2 is a front elevation of a buggy or runabout, showing our invention complete as applied to use in its operative position and showing the same in that position designed to hold the shaft or tongue in connection with the axle. Fig. 3 shows a slightly-varied form of arrangement of the parts, whereby a downward pressure upon the releasing-rod will operate our invention and release a tongue or shaft. Fig. 4 is a detail view showing the preferred construction of the locking-fingers employed to hold the tongue or shaft in union with the thills of the axle.

The various details and coöperating accessories of our invention will for convenience be designated by numerals, the same numeral applying to a similar part throughout the several views.

In carrying out our invention we provide the box-like casing 1, which is secured in any preferred way, preferably to the front side and central portion of the axle immediately below the fifth-wheel of the vehicle, it being understood that our releasing appliance is readily applicable to all manner of vehicles, as hereinbefore set forth, which may be drawn by horse or other draft-animals and from which it will be at times desirable to instantly release the same, as in cases when the horses have become frightened and are running away. Within the casing 1 thus or otherwise constructed and mounted in position for use we locate the bell-cranks or plates 2, which are pivotally held in place by the rods or rivets 3, as shown in Figs. 2 and 3. In Fig. 2 we have shown the bell-cranks 2 as suspended downward from their pivot-point, and at their lower end we provide two apertures, and in the outer aperture we pivotally secure the inner ends of the rods 4, the outer ends of which are connected to the turnbuckle 5 by means of the link 6. The turnbuckle is mounted upon the threaded inner end 7 of the plunger or finger 8, which is operatively disposed within the casing 9 and held extended normally outward by the compression-spring 10, thereby causing the extreme outer end of the plunger to take through the apertures in the ears 11, which are carried, as is common, by the clip 12, said clip being held in place by the plate 13 and the nuts 14, as is usual. The outer end of the housing 9 is preferably threaded into a suitable seat provided in the inner ear 11, thereby insuring that said housing 9 will be securely held in its operative position and enable the plunger to be freely withdrawn from the ears 11.

In order to place the plungers 8 under the complete control of the operator, we pivotally connect the controlling-shaft 15 to the apertures provided in the inner side of the plates 2 by means of the links 16. The said controlling-shaft 15, as it will be observed in Fig. 2, is provided with a suitable handle 17, by which the shaft may be readily controlled by the operator.

By reference to the construction shown in Fig. 2 it will be obvious that when it is desired to release the shaft or tongue and wholly disconnect the same from the ears 11 all that is necessary to be done is to draw sharply upon the shaft 15, when the plungers 8 will be instantly withdrawn from engagement with the thills, and thereby release the same, and in cases where the horses are running away check further movement of the vehicle.

In Fig. 3 we have shown substantially the same construction as that presented in Fig. 2, excepting that the disposition of the bell-cranks or plates 2 is opposite to that shown in Fig. 2, thus enabling the controlling-shaft 18 to be forced downward as by placing the foot upon the knob or button 19, inasmuch as said shaft is preferably extended upward through the bottom of the carriage or wagon, and thereby disposing the button 19 at a convenient point to be controlled by the foot of the operator. All that is necessary to be done in operating the device (shown in Fig. 3) is to press sharply down upon the shaft 18, causing the bell-cranks to move toward each other upon their pivot-points 3, and thereby withdraw the plungers 8 from their position in the ears 11, thus instantly releasing the shafts or tongue.

Our invention will not only be found very desirable, important, and useful for releasing runaway animals from a vehicle, but will also be found a great convenience, whereby the tongue or shafts of a vehicle may be quickly removed when it is desired to store away the vehicle in the smallest space or when it becomes desirable to replace a shaft by a tongue, or vice versa.

While we have described the preferred combination and construction of parts deemed necessary in materializing our invention, we wish to comprehend all substantial equivalents and substitutes which may be considered as fairly falling within the scope of our invention.

Having thus fully described our invention, what we claim as new, and desire to secure by Letters Patent, is—

The herein-described releasing device for vehicles, the combination with a vehicle, of a suitable casing; bell-cranks operatively mounted in said casing; a pair of plungers each adapted to extend through the apertures in the ears of the thill; a pair of cylindrical housings adapted to retain said plungers, said housings being threaded into the inner ears 11; means to adjustably connect said plungers and bell-crank; a controlling-shaft extending to a point convenient to the operator and means to connect said bell-crank and shaft whereby a movement of the shaft by the operator will withdraw the plungers and release the shaft or tongue, substantially as set forth.

In testimony whereof we affix our signatures in presence of two witnesses.

JOHN F. HINRICHS.
TAMME R. TAMMEN.

Witnesses:
S. A. FOOTE,
R. G. RENKEN.